United States Patent
Cui et al.

(10) Patent No.: US 11,301,101 B2
(45) Date of Patent: Apr. 12, 2022

(54) TOUCH SUBSTRATE, METHOD FOR PREPARING THE SAME, AND DISPLAY DEVICE

(71) Applicants: MIANYANG BOE OPTOELECTRONICS TECHNOLOGY CO., LTD., Sichuan (CN); BOE TECHNOLOGY GROUP CO., LTD., Beijing (CN)

(72) Inventors: Yingxi Cui, Beijing (CN); Yunte Chen, Beijing (CN); Hu Zhang, Beijing (CN); Lubiao Sun, Beijing (CN); Zhengde Liu, Beijing (CN); Huina Qiao, Beijing (CN)

(73) Assignees: Mianyang Boe Optoelectronics Technology Co., Ltd., Sichuan (CN); Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/037,375

(22) Filed: Sep. 29, 2020

(65) Prior Publication Data
US 2021/0191570 A1 Jun. 24, 2021

(30) Foreign Application Priority Data
Dec. 19, 2019 (CN) .......................... 201911317101.0

(51) Int. Cl.
*G06F 3/044* (2006.01)
(52) U.S. Cl.
CPC .. *G06F 3/0446* (2019.05); *G06F 2203/04103* (2013.01); *G06F 2203/04111* (2013.01)

(58) Field of Classification Search
CPC ......... G06F 3/0446; G06F 2203/04103; G06F 2203/04111; G06F 2203/04102; G06F 3/0443; G06F 2203/04112; G06F 3/0412
See application file for complete search history.

(56) References Cited

U.S. PATENT DOCUMENTS 10,936,132 B2 * 3/2021 Jang ...................... G06F 3/0416
11,150,753 B2 * 10/2021 Lee ....................... G06F 3/0446
(Continued)

FOREIGN PATENT DOCUMENTS

TW 201614464 A * 4/2016
TW 201809992 A * 3/2018

*Primary Examiner* — Amy Onyekaba
(74) *Attorney, Agent, or Firm* — Muncy, Geissler, Olds & Lowe, P.C.

(57) ABSTRACT

The present disclosure provides a touch substrate, a method for preparing the same, and a touch display device. The touch substrate includes: a base substrate; a plurality of touch electrodes located on the base substrate; a touch electrode bridge located on the base substrate and configured to connect the plurality of touch electrodes; and a plurality of first insulating patterns located on a surface of the touch electrode bridge away from the base substrate, in which the plurality of first insulating patterns is arranged in such a manner that adjacent first insulating patterns are separated from each other; and a plurality of second insulating patterns each located between the adjacent first insulating patterns, wherein the first insulating patterns and the second insulating patterns are made of different materials. The touch substrate according to the present disclosure has a high yield.

20 Claims, 6 Drawing Sheets

(56) References Cited

U.S. PATENT DOCUMENTS

| | | | | |
|---|---|---|---|---|
| 2011/0279401 | A1* | 11/2011 | Hong | G06F 3/0446 |
| | | | | 345/174 |
| 2013/0241857 | A1* | 9/2013 | Chung | G06F 3/0443 |
| | | | | 345/173 |
| 2015/0022731 | A1* | 1/2015 | Kang | G06F 3/0443 |
| | | | | 349/12 |
| 2015/0085205 | A1* | 3/2015 | Chen | G06F 3/0448 |
| | | | | 349/12 |
| 2017/0160829 | A1* | 6/2017 | Liu | G06F 3/0443 |
| 2017/0160830 | A1* | 6/2017 | Lee | G06F 3/0443 |
| 2017/0237037 | A1* | 8/2017 | Choi | H01L 51/56 |
| | | | | 257/40 |
| 2017/0364187 | A1* | 12/2017 | Zhai | G02F 1/13338 |
| 2018/0033833 | A1* | 2/2018 | An | H01L 51/5256 |
| 2018/0157781 | A1* | 6/2018 | Rastogi | G06F 30/394 |
| 2018/0203531 | A1* | 7/2018 | Tsai | G06F 3/04164 |
| 2018/0299958 | A1* | 10/2018 | Wang | G06F 3/01 |
| 2019/0056818 | A1* | 2/2019 | Wang | G06F 3/04164 |
| 2019/0064958 | A1* | 2/2019 | Liu | G06F 3/0446 |
| 2019/0121463 | A1* | 4/2019 | Park | G06F 3/0445 |
| 2019/0155417 | A1* | 5/2019 | Lee | G06F 3/044 |
| 2019/0171322 | A1* | 6/2019 | Zhai | G02F 1/133345 |
| 2019/0179468 | A1* | 6/2019 | Chen | G06F 3/0446 |
| 2019/0302955 | A1* | 10/2019 | Li | G06F 3/0416 |
| 2019/0326360 | A1* | 10/2019 | Gwon | G06F 3/0443 |
| 2019/0354211 | A1* | 11/2019 | Li | H03K 17/962 |
| 2020/0119113 | A1* | 4/2020 | Lee | H01L 51/5012 |
| 2020/0401246 | A1* | 12/2020 | Lee | G06F 3/0446 |
| 2021/0064188 | A1* | 3/2021 | Lee | G06F 3/0443 |
| 2021/0089166 | A1* | 3/2021 | Kwon | G06F 3/04164 |
| 2021/0132727 | A1* | 5/2021 | Lee | G06F 3/0414 |
| 2021/0165528 | A1* | 6/2021 | You | G06F 3/0445 |

* cited by examiner

TOUCH SUBSTRATE, METHOD FOR PREPARING THE SAME, AND DISPLAY DEVICE

CROSS-REFERENCE TO RELATED APPLICATION

This application claims a priority to Chinese Patent Application No. 201911317101.0 filed on Dec. 19, 2019, the disclosures of which are incorporated in their entirety by reference herein.

TECHNICAL FIELD

The present disclosure relates to the field of touch technology, in particular, to a touch substrate, a method for preparing the same, and a display device including the display substrate.

BACKGROUND

When the existing touch substrate is attached to the flexible circuit board, the stress generated by the bending of the film layer at the bent edge cannot be released, which easily causes the insulation layer in the touch substrate to break. When the broken crack is serious, the broken crack will extend to the touch area, thereby causing the touch function of this part of the touch area to fail.

SUMMARY

In one aspect, the present disclosure provides a touch substrate, including: a base substrate; a plurality of touch electrodes located on the base substrate; a touch electrode bridge located on the base substrate and configured to connect the plurality of touch electrodes; a plurality of first insulating patterns located on a surface of the touch electrode bridge away from the base substrate, in which the plurality of first insulating patterns is arranged in such a manner that adjacent first insulating patterns are separated from each other; and a plurality of second insulating patterns each located between the adjacent first insulating patterns, in which the first insulating patterns and the second insulating patterns are made of different materials.

Optionally, the first insulating patterns are made of an inorganic insulating material, and the second insulating patterns are made of an organic insulating material.

Optionally, a distance between a surface of the first insulating patterns away from the base substrate and the surface of the base substrate is equal to a distance between a surface of the second insulating patterns away from the base substrate and the surface of the base substrate.

Optionally, the plurality of touch electrodes is located on a surface of the first insulating patterns away from the base substrate, and an orthogonal projection of each of the plurality of touch electrodes on the base substrate is located within an orthogonal projection of a corresponding the first insulating pattern on the base substrate.

Optionally, at least a part of an orthogonal projection of each of the second insulating patterns on the base substrate is located between the orthogonal projections of the adjacent touch electrodes on the base substrate.

Optionally, the plurality of touch electrodes is arranged in an array on the base substrate, adjacent touch electrodes in the first direction are directly connected, and adjacent touch electrodes in the second direction are connected by the touch electrode bridge.

Optionally, the first direction is a column direction of the array, the second direction is a row direction of the array, and the first direction and the second direction are perpendicular to each other.

In another aspect, embodiments of the present disclosure further provide a display device, including a display substrate and the above touch substrate located on a light exiting surface of the display substrate.

In yet another aspect, embodiments of the present disclosure further provide a method for preparing a touch substrate, including: providing a base substrate; forming a touch electrode bridge on the base substrate; forming a plurality of first insulating patterns on a surface of the touch electrode bridge away from the base substrate, in which the plurality of first insulating patterns is arranged in such a manner that adjacent first insulating patterns are separated from each other; forming a plurality of second insulating patterns on the first insulating patterns, in which the second insulating pattern are located between adjacent first insulating patterns, and the first insulating patterns and the second insulating patterns are made of different material; and forming a plurality of touch electrodes on the first insulating pattern and the second insulating pattern, in which the plurality of touch electrodes is connected to the touch electrode bridge through a via hole arranged in the first insulation layer or the second insulation layer.

Optionally, the forming the first insulating patterns and the forming the second insulating patterns include: forming a first insulating layer on a surface of the touch electrode bridge away from the base substrate by an inorganic insulating material, and patterning the first insulating layer to form a plurality of the first insulating patterns; and forming a second insulating layer on the first insulating patterns and the touch electrode bridge by an organic insulating material, and patterning the second insulating layer to form a plurality of the second insulating patterns located between adjacent first insulating patterns.

Optionally, a distance between a surface of the first insulating pattern away from the base substrate and the surface of the base substrate is equal to a distance between a surface of the second insulating pattern away from the base substrate and the surface of the base substrate.

Optionally, an orthogonal projection of each of the plurality of touch electrodes on the base substrate is located within an orthogonal projection of a corresponding the first insulating pattern on the base substrate.

Optionally, at least a part of an orthogonal projection of each of the second insulating patterns on the base substrate is located between the orthogonal projections of the adjacent touch electrodes on the base substrate.

Optionally, the plurality of touch electrodes is arranged in an array on the base substrate, adjacent touch electrodes in the first direction are directly connected, and adjacent touch electrodes in the second direction are connected by the touch electrode bridge.

DETAILED DESCRIPTION

In order to make the technical problems to be solved, the technical solutions, and the advantages of the examples of the present disclosure, the present disclosure will be described hereinafter in conjunction with the drawings and the detailed description.

As shown in FIGS. 1 to 6, the method for preparing the touch substrate in the related art includes the following steps.

Figure 1:
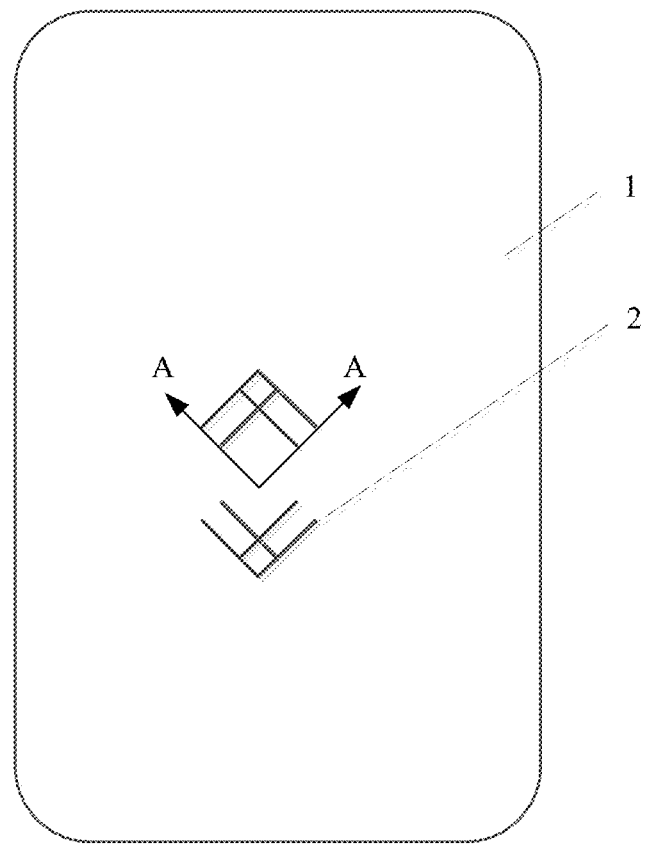
FIG. 1 is a schematic view showing a structure in which a touch electrode bridge is formed on a base substrate in the related art.
Figure 2:
FIG. 2 shows a schematic cross-sectional view of FIG. 1 in the AA direction.

Step 1: as shown in FIGS. 1 and 2, forming a touch electrode bridge 2 on the base substrate 1.

Figure 3:
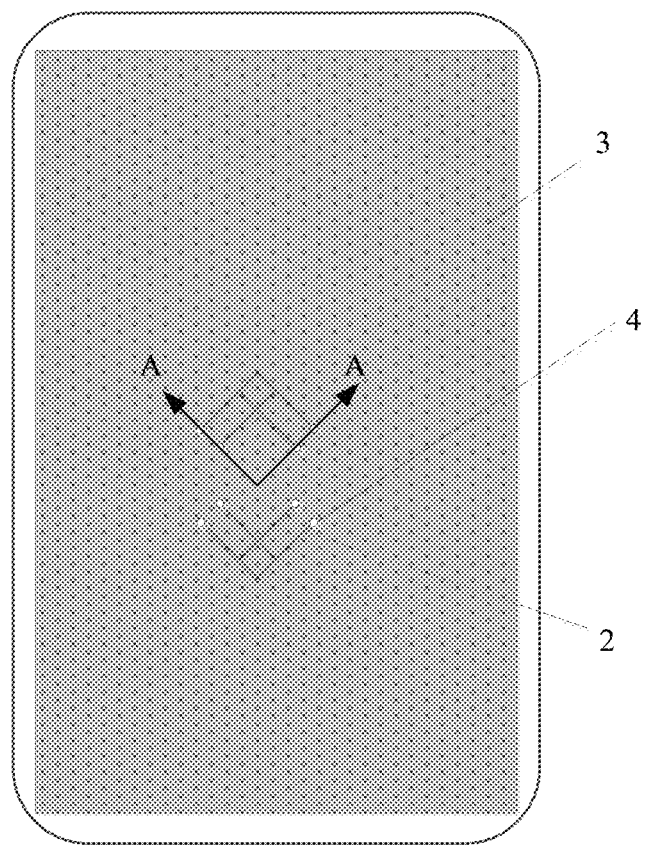
FIG. 3 is a schematic view showing a structure in which an entire insulating layer covering the touch electrode bridge is formed in the related art.
Figure 4:
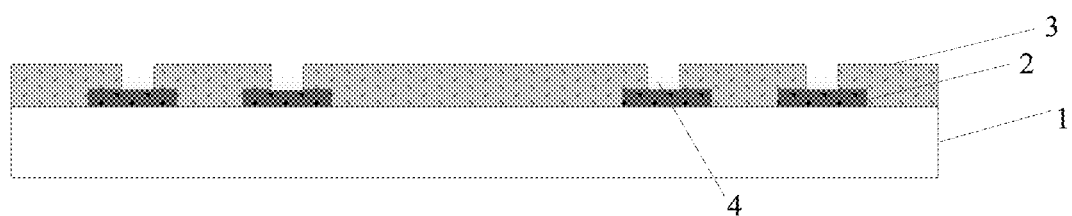
FIG. 4 shows a schematic cross-sectional view of FIG. 3 in the AA direction.

Step 2: as shown in FIGS. 3 and 4, forming an entire insulating layer 3 covering the touch electrode bridge 2, the insulating layer 3 including a via hole 4 exposing the touch electrode bridge 2.

Figure 5:
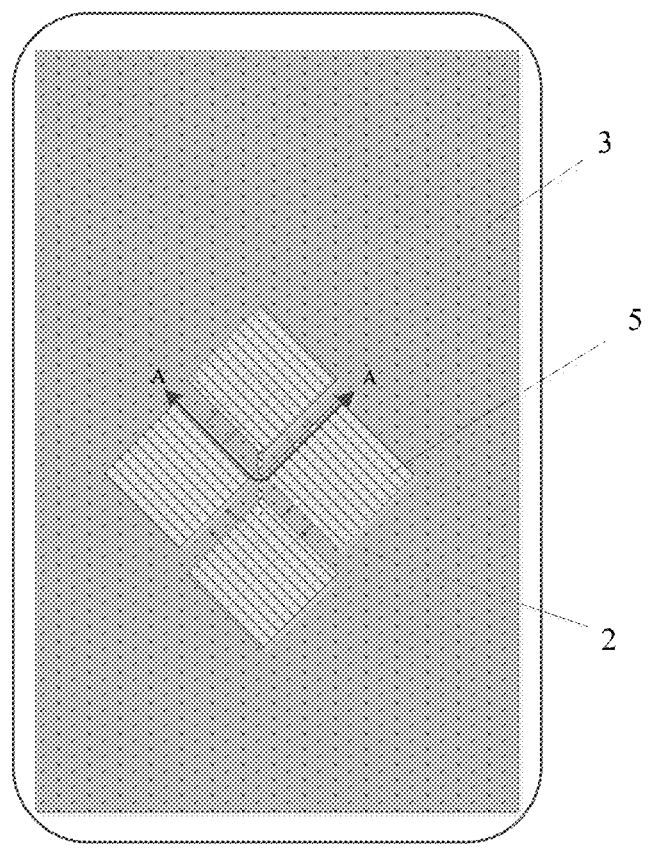
FIG. 5 is a schematic view showing a structure in which touch electrodes are formed in the related art.
Figure 6:
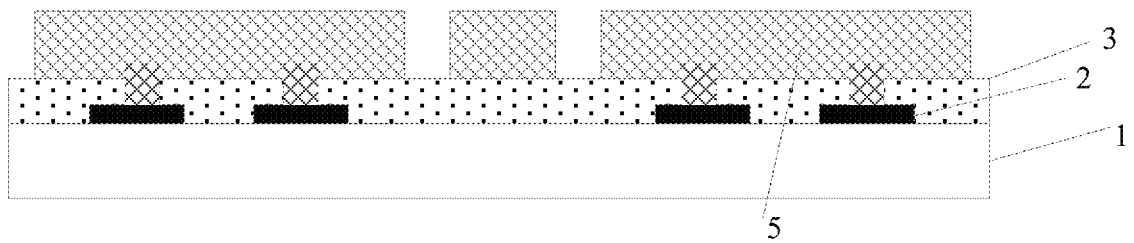
FIG. 6 shows a schematic cross-sectional view of FIG. 5 in the AA direction.

Step 3: as shown in FIG. 5 and FIG. 6, forming a touch electrode 5 is formed, the adjacent touch electrode 5 being connected to the touch electrode bridge 5 through a via hole 4 penetrating through the insulating layer 3.

In the touch substrate of the related art, the entire insulating layer is covered on the touch electrode bridge, and the via hole is arranged only at the position of the touch electrode bridge. When the touch substrate is attached to the flexible circuit board, the stress generated by the bending of the film layer at the bent edge cannot be released, which easily causes the insulation layer in the touch substrate to break. When the broken crack is serious, the broken crack will extend to the touch area, thereby causing the touch function of this part of the touch area to fail. In addition, when the touch substrate integrates all the display function elements, the crack will extend to the display area when the crack is serious. Therefore, water vapor and air enter the display area through the crack, thereby causing the light emitting device to fail and forming black spots.

In view of the above technical problems, the embodiments of the present disclosure provide a touch substrate, a method for preparing the same, and a display device. The touch substrate according to the present disclosure has a high yield, and the method for preparing the same according to the present disclosure can ensure the yield of the touch substrate.

The embodiment of the present disclosure provides a touch substrate, as shown in FIGS. 7 to 12, including: a base substrate 1; a plurality of touch electrodes 5 located on the base substrate 1; a touch electrode bridge 2 located on the base substrate 1 and configured to connect the plurality of touch electrodes 5; a plurality of first insulating patterns 61 located on a surface of the touch electrode bridge 2 away from the base substrate 1, in which the plurality of first insulating patterns 61 is arranged in such a manner that adjacent first insulating patterns 61 are separated from each other; and a plurality of second insulating patterns 62 located between the adjacent first insulating patterns 61, in which the first insulating patterns 61 and the second insulating patterns 62 are made of different materials.

Optionally, adjacent first insulating patterns 61 in the plurality of first insulating patterns are separated by a certain distance, for example, a set distance.

In the embodiment of the present disclosure, the insulating layer covering the touch electrode bridge is not an entire insulating layer, but a plurality of the first insulating patterns or a combination of the first insulating patterns and the second insulating patterns arranged to be separated by a certain distance. When the touch substrate is attached to the flexible circuit board, the stress generated by the bending of the film layer at the bent edge can be released through a gap between the first insulating patterns or between the first insulating patterns and the second insulating patterns. Therefore, the touch substrate according to the present disclosure can prevent cracks from being generated during bending, thereby improving the yield of the touch substrate.

Optionally, the base substrate 1 may be a rigid substrate or a flexible substrate. When the base substrate 1 is a flexible substrate, a flexible touch panel can be achieved. When the flexible touch substrate is bent, the stress of bending the film layer can be released through the gap between the first insulating patterns 61, which will not cause cracks in the first insulating patterns 61.

Optionally, the first insulating pattern 61 may be made of an inorganic insulating material, such as an oxide, a nitride, or an oxynitride. The corresponding raw material reaction gas is a mixed gas of $SiH_4$, $NH_3$ and $N_2$, or a mixed gas of $SiH_2Cl_2$, $NH_3$ and $N_2$. As shown in FIGS. 7 to 12, a plurality of first insulating patterns 61 and a plurality of second insulating patterns cover the touch electrode bridge 2, and the plurality of first insulating patterns 61 further includes a via hole 4 exposing the touch electrode bridge 2.

Optionally, as shown in FIGS. 9 to 12, a distance between the surface of the first insulating patterns 61 away from the base substrate and the surface of the base substrate is equal to a distance between the surface of the second insulating patterns 62 away from the base substrate and the surface of the base substrate, that is, the first insulating patterns 61 and the second insulating patterns 62 may form a flat surface, which is conductive to the subsequent process steps. Optionally, the second insulating patterns 62 and the first insulating patterns 61 are made of different materials. Since the first insulating patterns 61 and the second insulating patterns 62 are not integral, but are independent of each other, when the touch substrate is bent, the stress generated by the bending of the film layer at the bending position can be released through the gap between the first insulating patterns 61 and the second insulating patterns 62. This further prevents cracks from being generated during bending, thereby improving the yield of the touch substrate.

Optionally, the first insulating patterns 61 may be made of an inorganic insulating material, and the second insulating patterns 62 may be made of an organic insulating material, such as polyimide and a photoresist.

In order to provide a flat surface for subsequent preparation steps, the distance between the surface of the first insulating patterns 61 away from the base substrate 1 and the surface of the base substrate is equal to the distance between the surface of the second insulating patterns 62 away from the base substrate 1 and the surface of the base substrate, that is, the first insulating pattern 61 and the second insulating pattern 62 may form a flat surface.

Figure 11:
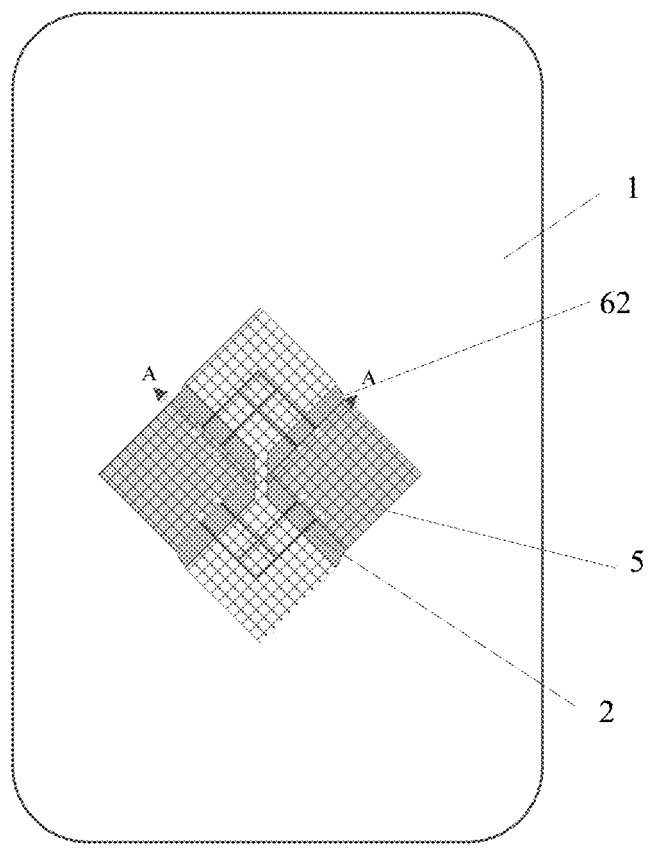
FIG. 11 is a schematic view showing a structure in which a touch electrode is formed according to an embodiment of the present disclosure.
Figure 12:
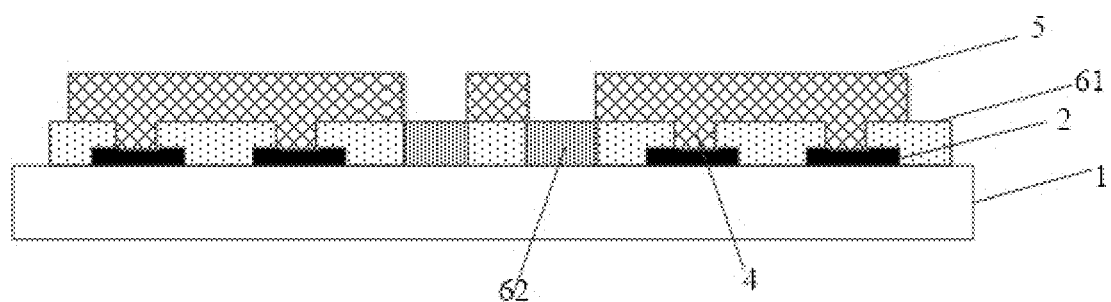
FIG. 12 shows a schematic cross-sectional view of FIG. 11 in the AA direction.

As shown in FIGS. 11 and 12, the touch substrate further includes a plurality of touch electrodes 5 located on the surface of the first insulating pattern 61 away from the base substrate 1. Optionally, an orthogonal projection of each of the plurality of touch electrodes 5 on the base substrate 1 is located within an orthogonal projection of a corresponding the first insulating pattern 61 on the base substrate 1.

Optionally, at least a part of an orthogonal projection of each of the second insulating patterns on the base substrate is located between the orthogonal projections of the adjacent touch electrodes on the base substrate. Optionally, the plurality of touch electrodes 5 is arranged in an array on the base substrate 1, adjacent touch electrodes 5 in the first direction are directly connected, and adjacent touch electrodes 5 in the second direction are connected by the touch electrode bridge 2. For example, as shown in FIG. 11, in this embodiment, the first direction may be a column direction of the array, and the second direction may be a row direction of the array. Optionally, the first direction and the second direction are perpendicular to each other.

The size of the first insulating patterns 61 can be designed as required, but it is necessary to ensure that the orthogonal projection of each of the touch electrode 5 on the base substrate 1 is located within the orthogonal projection of a corresponding the first insulating pattern 61 on the base substrate 1, and to ensure that the stress of the bending film layer when the touch substrate is bent can be released effectively.

Embodiments of the present disclosure further provide a display device, including a display substrate and the above touch substrate located on a light exiting surface of the display substrate.

In the touch substrate according to the embodiment of the present disclosure, the insulating layer covering the touch electrode bridge is not an entire insulating layer, but a plurality of the first insulating patterns or a combination of the first insulating patterns and the second insulating patterns arranged to be separated by a certain distance. When the touch substrate is attached to the flexible circuit board, the stress generated by the bending of the film layer at the bent edge can be released through the gap between the first insulating patterns. Therefore, the display device according to the present disclosure prevents cracks from being generated during bending, thereby improving the yield of the touch substrate.

The display device of the present disclosure includes but is not limited to: a radio frequency unit, a network module, an audio output unit, an input unit, a sensor, a display unit, an user input unit, an interface unit, a memory, a processor, a power supply and other components. Those skilled in the art would understand that the structure of the above display device does not constitute a limitation on the display device, and the display device may include more or less of the above components, or combine some components, or have different component arrangements. In another embodiment of the present disclosure, the display device includes, but is not limited to, a displayer, a mobile phone, a tablet computer, a television, a wearable electronic device, a navigation display device, a digital photo frame, or the like. In addition, the display device may be any product or component having a display function, such as a television, a display, a mobile phone, a tablet computer, etc., and may also include a flexible circuit board, a printed circuit board, and a backplane.

The embodiment of the present disclosure further provides a method for preparing a touch substrate, including: providing a base substrate; forming a touch electrode bridge on the base substrate; forming a plurality of first insulating patterns on a surface of the touch electrode bridge away from the base substrate, in which the plurality of first insulating patterns is arranged in such a manner that adjacent first insulating patterns are separated from each other; forming a plurality of second insulating patterns on the first insulating patterns, in which the second insulating patterns are located between adjacent first insulating patterns, and the first insulating patterns and the second insulating patterns are made of different material; and forming a plurality of touch electrodes on the first insulating pattern and the second insulating pattern, in which the plurality of touch electrodes is connected to the touch electrode bridge through a via hole arranged in the first insulation layer or the second insulation layer.

In the touch substrate prepared by the embodiment of the present disclosure, the insulating layer covering the touch electrode bridge is not an entire insulating layer, but a plurality of the first insulating patterns or a combination of the first insulating patterns and the second insulating patterns arranged to be separated by a certain distance. When the touch substrate is attached to the flexible circuit board, the stress generated by the bending of the film layer at the bent edge can be released through the gap between the first insulating patterns. Therefore, the touch substrate prepared by the method according to the present disclosure can prevent cracks from being generated during bending, thereby improving the yield of the touch substrate.

Optionally, a distance between the surface of the first insulating patterns 61 away from the base substrate and the surface of the base substrate is equal to a distance between the surface of the second insulating patterns 62 away from the base substrate and the surface of the base substrate, that is, the first insulating patterns 61 and the second insulating patterns 62 may form a flat surface, which is conductive to the subsequent process steps. Optionally, the second insulating patterns 62 and the first insulating patterns 61 are made of different materials. Since the first insulating patterns 61 and the second insulating patterns 62 are not integral, but are independent of each other, when the touch substrate is bent, the stress generated by the bending of the film layer at the bending position can be released through the gap between the first insulating patterns 61 and the second insulating patterns 62. This further prevents cracks from being generated during bending, thereby improving the yield of the touch substrate.

Optionally, the first insulating patterns 61 may be made of an inorganic insulating material, and the second insulating patterns 62 may be made of an organic insulating material, such as polyimide and photoresist.

Optionally, the forming the first insulating patterns 61 and the forming the second insulating patterns 62 include: forming a first insulating layer on the surface of the touch electrode bridge away from the base substrate by an inorganic insulating material, and patterning the first insulating layer to form a plurality of the first insulating patterns; and forming a second insulating layers on the first insulating patterns and the touch electrode bridge by an organic insulating material, and patterning the second insulating layer to form a plurality of the second insulating patterns. In order to provide a flat surface for subsequent process steps, the distance between the surface of the first insulating patterns 61 away from the base substrate 1 and the surface of the base substrate is equal to the distance between the surface of the second insulating patterns 62 away from the base substrate 1 to the surface of the base substrate.

Optionally, an orthogonal projection of each of the plurality of touch electrodes on the base substrate is located within an orthogonal projection of a corresponding the first insulating pattern on the base substrate. Optionally, at least a part of an orthogonal projection of each of the second insulating patterns on the base substrate is located between the orthogonal projections of the adjacent touch electrodes on the base substrate.

Optionally, the plurality of touch electrodes is arranged in an array on the base substrate, adjacent touch electrodes in the first direction are directly connected, and adjacent touch electrodes in the second direction are connected by the touch electrode bridge. For example, the first direction is a column direction of the array, and the second direction is a row direction of the array. Optionally, the first direction and the second direction are perpendicular to each other.

Optionally, as shown in FIGS. 7 to 12, the method for preparing the touch substrate specifically includes the following steps.

Figure 7:
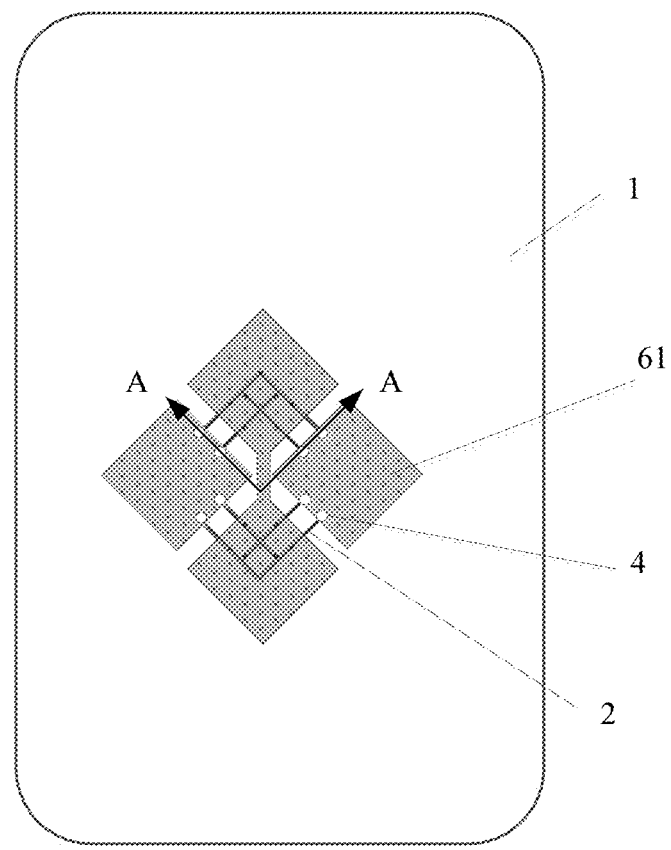
FIG. 7 is a schematic view showing a structure in which a touch electrode bridge and a plurality of first insulating patterns are formed on a base substrate according to an embodiment of the present disclosure.
Figure 8:
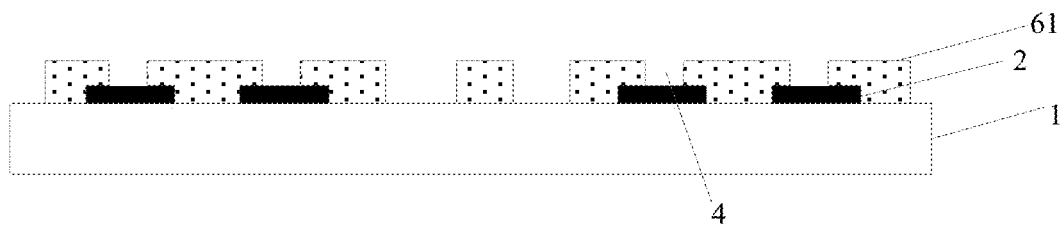
FIG. 8 shows a schematic cross-sectional view of FIG. 7 in the AA direction.

Step 1: as shown in FIGS. 7 and 8, providing a base substrate 1, and forming a pattern of touch electrode bridges 2 on the base substrate 1.

The base substrate 1 may be a flexible substrate or a rigid substrate. The rigid substrate may be a glass substrate or a quartz substrate, and the flexible substrate may be a polyimide substrate.

Specifically, a metal layer having a thickness of about 500 to 4,000 Å is deposited on the base substrate 1 by sputtering or thermal evaporation, in which the metal layer may be a metal, such as Cu, Al, Ag, Mo, Cr, Nd, Ni, Mn, Ti, Ta and W, or an alloys of these metals. One layer of the photoresist is coated on the metal layer, and the photoresist is exposed using a mask, so that the photoresist forms a photoresist unreserved area and a photoresist reserved area. The photoresist reserved area corresponds to an area in which the pattern of the touch electrode bridge 2 is located, and the photoresist unreserved area corresponds to an area outside of the above pattern. Then, development processing is performed, so that the photoresist in the photoresist unreserved area is completely removed, and the thickness of the photoresist in the photoresist reserved area remains unchanged. Then, the metal layer in the unreserved area of the photoresist is completely etched by an etching process, and the remaining photoresist is stripped to form the pattern of the touch electrode bridge 2.

Step 2: as shown in FIGS. 7 and 8, forming a plurality of first insulating patterns 61.

Specifically, an insulating layer having a thickness of 500 to 5,000 Å may be deposited on base substrate 1 after the step 1 by a plasma enhanced chemical vapor deposition (PECVD) method. The insulating layer may be made of an oxide, a nitride, or an oxynitride. The corresponding reaction gas is a mixed gas of $SiH_4$, $NH_3$, and $N_2$, or a mixed gas of $SiH_2Cl_2$, $NH_3$, and $N_2$. The insulating layer is patterned to form a first insulating pattern 61. The first insulating pattern 61 includes a via hole 4 exposing the touch electrode bridge 2.

Figure 9:
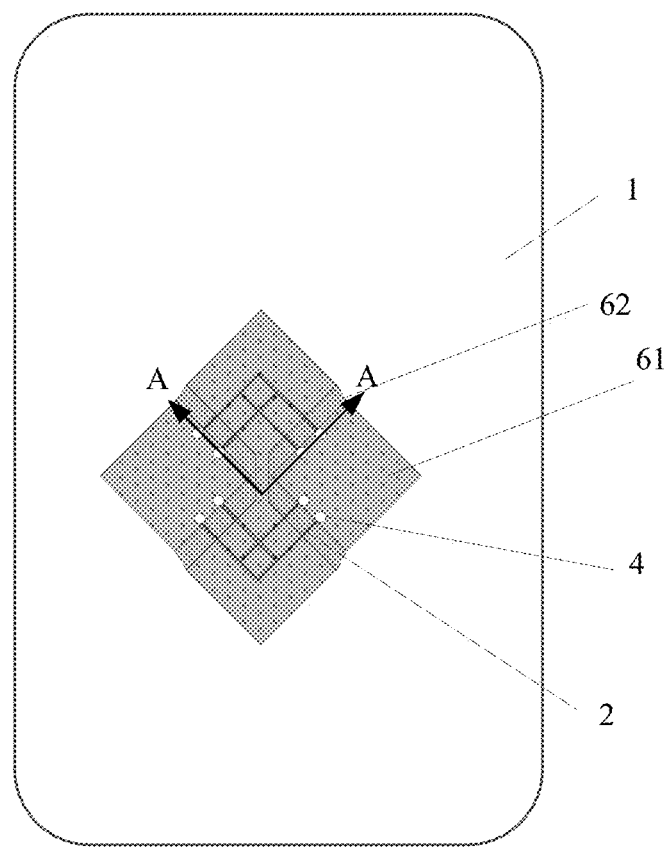
FIG. 9 is a schematic diagram showing a structure in which a plurality of second insulating patterns is formed according to an embodiment of the present disclosure.
Figure 10:
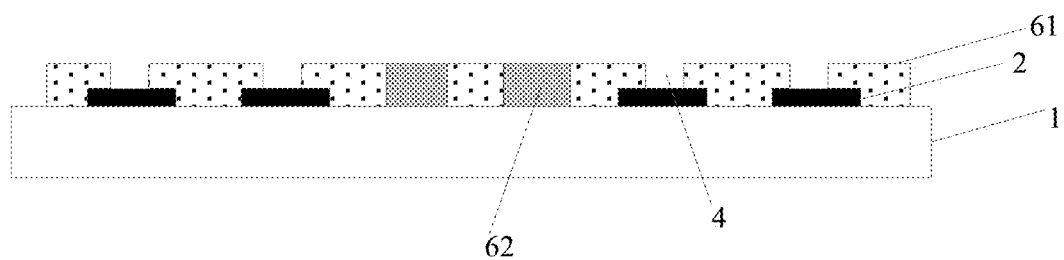
FIG. 10 shows a schematic cross-sectional view of FIG. 9 in the AA direction.

Step 3: as shown in FIGS. 9 and 10, forming a plurality of second insulating patterns 62.

Specifically, an organic resin layer having a thickness of about 4,000 to 30,000 Å can be coated on the base substrate 1 after step 2 is completed. The organic resin can be benzocyclobutene (BCB) or other organic photosensitive materials. After the exposure and development, a plurality of second insulating patterns 62 is formed. The second insulating patterns 62 fill the gaps between the first insulating patterns 61. The surface of the second insulating patterns 62 away from the base substrate 1 is flush with the surface of the first insulating pattern 61 away from the base substrate 1.

Step 4: as shown in FIGS. 11 and 12, forming the touch electrode 5.

Specifically, a transparent conductive layer having a thickness of about 300 to 1,500 Å is deposited by sputtering or thermal evaporation on the base substrate 1 after the step 3 is completed. The transparent conductive layer may be ITO, IZO or other transparent metal oxides. One layer of the photoresist is coated on the transparent conductive layer, and the photoresist is exposed using a mask, so that the photoresist forms a photoresist unreserved area and a photoresist reserved area. The photoresist reserved area corresponds to an area in which the pattern of the touch electrode 5 is located, and the photoresist unreserved area corresponds to an area outside of the above pattern. Then, development processing is performed, so that the photoresist in the photoresist unreserved area is completely removed, and the thickness of the photoresist in the photoresist reserved area remains unchanged. Then, the transparent conductive layer film in the unreserved area of the photoresist is completely etched by an etching process. The remaining photoresist is stripped to form the pattern of the touch electrode 5. The pattern of the touch electrode 5 is shown in FIG. 11, and the touch electrode 5 is connected to the touch electrode bridge 2 through the via hole 4.

It should be noted that the various embodiments in this specification are described in a progressive manner, and the same or similar portions between the various embodiments can be referred to each other, and each embodiment focuses on the differences from other embodiments. In particular, for the method embodiment, since it is basically similar to the product embodiment, the description is relatively simple, and the relevant parts can be referred to a part of the description of the product embodiment.

Unless otherwise defined, technical terms or scientific terms used herein have the normal meaning commonly understood by one skilled in the art in the field of the present disclosure. The words "first", "second", and the like used herein does not denote any order, quantity, or importance, but rather merely serves to distinguish different components. The "including", "comprising", and the like used in the present disclosure means that the element or item appeared in front of the word encompasses the element or item and their equivalents listed after the word, and does exclude other elements or items. The word "connected" or "connecting" and the like are not limited to physical or mechanical connections, but may include electrical connections, whether direct or indirect. "On", "under", "left", "right" and the like are only used to represent relative positional relationships, and when the absolute position of the described object is changed, the relative positional relationship may also be changed, accordingly.

The above description is merely the specific embodiment of the present disclosure, but the scope of the present disclosure is not limited thereto. Moreover, any person skilled in the art would readily conceive of modifications or substitutions within the technical scope of the present dis-

What is claimed is:

1. A touch substrate, comprising:
   a base substrate;
   a plurality of touch electrodes located on the base substrate;
   a touch electrode bridge located on the base substrate and configured to connect the plurality of touch electrodes;
   a plurality of first insulating patterns located on a surface of the touch electrode bridge away from the base substrate, wherein the plurality of first insulating patterns is arranged in such a manner that adjacent first insulating patterns are separated from each other; and
   a plurality of second insulating patterns each located between the adjacent first insulating patterns, wherein the first insulating patterns and the second insulating patterns are made of different materials.

2. The touch substrate of claim 1, wherein the first insulating patterns are made of an inorganic insulating material, and the second insulating patterns are made of an organic insulating material.

3. The touch substrate of claim 1, wherein a distance between a surface of the first insulating patterns away from the base substrate and a surface of the base substrate is equal to a distance between a surface of the second insulating patterns away from the base substrate and the surface of the base substrate.

4. The touch substrate of claim 1, wherein the plurality of touch electrodes is located on a surface of the first insulating patterns away from the base substrate, and an orthogonal projection of each of the plurality of touch electrodes on the base substrate is located within an orthogonal projection of a corresponding the first insulating pattern on the base substrate.

5. The touch substrate of claim 1, wherein at least a part of an orthogonal projection of each of the second insulating patterns on the base substrate is located between the orthogonal projections of the adjacent touch electrodes on the base substrate.

6. The touch substrate of claim 1, wherein the plurality of touch electrodes is arranged in an array on the base substrate, adjacent touch electrodes in the first direction are directly connected, and adjacent touch electrodes in the second direction are connected by the touch electrode bridge.

7. The touch substrate of claim 1, wherein the first direction is a column direction of the array, the second direction is a row direction of the array, and the first direction and the second direction are perpendicular to each other.

8. A display device, comprising a display substrate and the touch substrate of claim 1 located on a light exiting surface of the display substrate.

9. The display device of claim 8, wherein the first insulating patterns are made of an inorganic insulating material, and the second insulating patterns are made of an organic insulating material.

10. The display device of claim 8, wherein a distance between a surface of the first insulating patterns away from the base substrate and a surface of the base substrate is equal to a distance between a surface of the second insulating patterns away from the base substrate and the surface of the base substrate.

11. The display device of claim 8, wherein the plurality of touch electrodes is located on a surface of the first insulating patterns away from the base substrate, and an orthogonal projection of each of the plurality of touch electrodes on the base substrate is located within an orthogonal projection of a corresponding the first insulating pattern on the base substrate.

12. The display device of claim 8, wherein at least a part of an orthogonal projection of each of the second insulating patterns on the base substrate is located between the orthogonal projections of the adjacent touch electrodes on the base substrate.

13. The display device of claim 8, wherein the plurality of touch electrodes is arranged in an array on the base substrate, adjacent touch electrodes in the first direction are directly connected, and adjacent touch electrodes in the second direction are connected by the touch electrode bridge.

14. The display device of claim 1, wherein the first direction is a column direction of the array, the second direction is a row direction of the array, and the first direction and the second direction are perpendicular to each other.

15. A method for preparing a touch substrate, comprising:
    providing a base substrate;
    forming a touch electrode bridge on the base substrate;
    forming a plurality of first insulating patterns on a surface of the touch electrode bridge away from the base substrate, wherein the plurality of first insulating patterns is arranged in such a manner that adjacent first insulating patterns are separated from each other;
    forming a plurality of second insulating patterns on the first insulating patterns, wherein the second insulating patterns are located between adjacent first insulating patterns, and the first insulating patterns and the second insulating patterns are made of different material; and
    forming a plurality of touch electrodes on the first insulating pattern and the second insulating pattern, wherein the plurality of touch electrodes is connected to the touch electrode bridge through a via hole arranged in the first insulation layer or the second insulation layer.

16. The method of claim 15, wherein the forming the first insulating patterns and the forming the second insulating patterns comprise:
    forming a first insulating layer on a surface of the touch electrode bridge away from the base substrate by an inorganic insulating material, and patterning the first insulating layer to form a plurality of the first insulating patterns; and
    forming a second insulating layer on the first insulating patterns and the touch electrode bridge by an organic insulating material, and patterning the second insulating layer to form a plurality of the second insulating patterns located between adjacent first insulating patterns.

17. The method of claim 15, wherein a distance between a surface of the first insulating pattern away from the base substrate and a surface of the base substrate is equal to a distance between a surface of the second insulating pattern away from the base substrate and the surface of the base substrate.

18. The method of claim 15, wherein an orthogonal projection of each of the plurality of touch electrodes on the base substrate is located within an orthogonal projection of a corresponding the first insulating pattern on the base substrate.

19. The method of claim 15, wherein at least a part of an orthogonal projection of each of the second insulating patterns on the base substrate is located between the orthogonal projections of the adjacent touch electrodes on the base substrate.

20. The method of claim 15, wherein the plurality of touch electrodes is arranged in an array on the base substrate, adjacent touch electrodes in the first direction are directly connected, and adjacent touch electrodes in the second direction are connected by the touch electrode bridge.

* * * * *